R. J. KENNEDY.
COMBINATION TOOL.
APPLICATION FILED SEPT. 25, 1908.
930,385.
Patented Aug. 10, 1909.
2 SHEETS—SHEET 1.
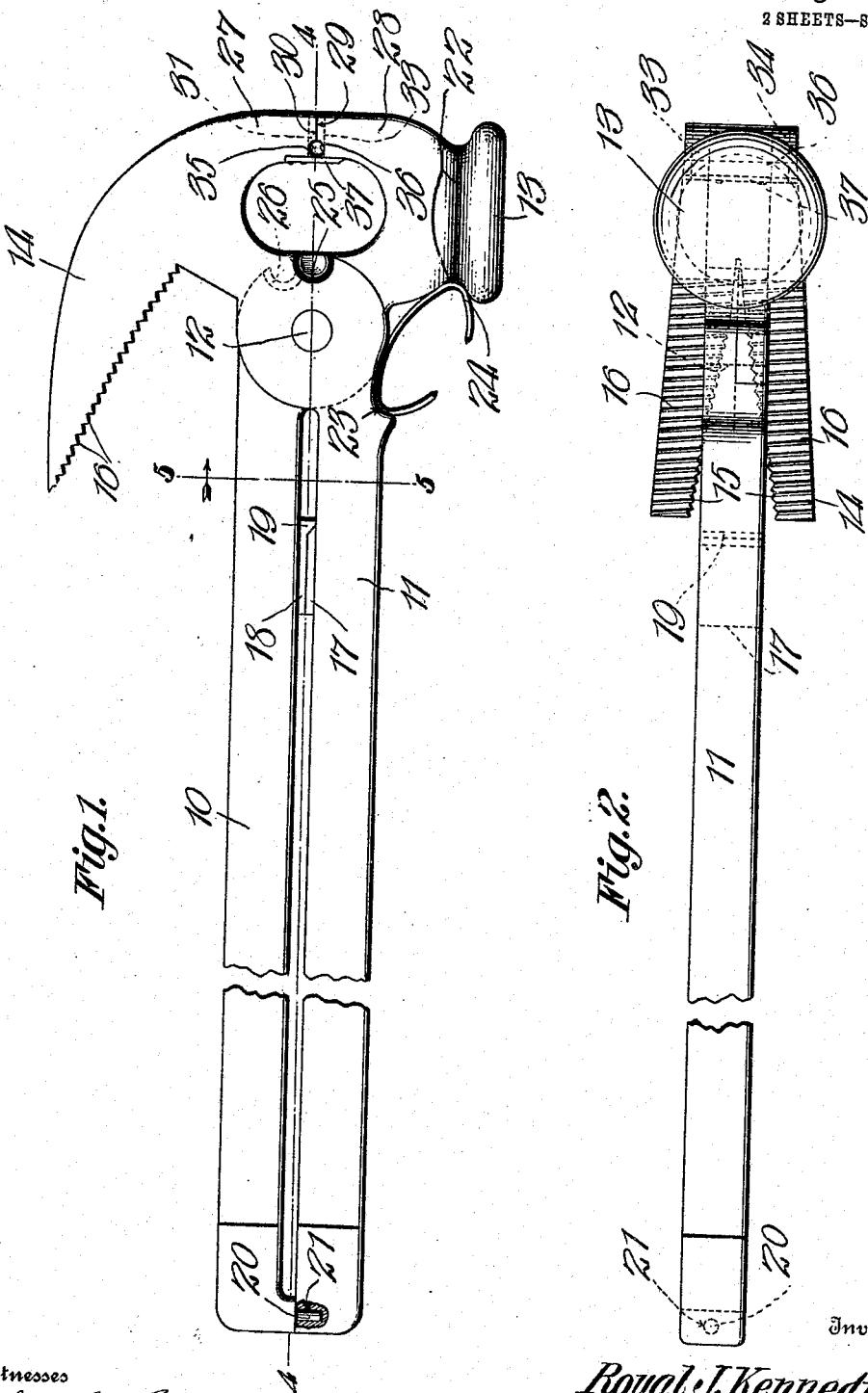
Witnesses
Chas. C. Richardson,
C. N. Woodward
Inventor
Royal J. Kennedy,
By
Attorneys.

R. J. KENNEDY.
COMBINATION TOOL.
APPLICATION FILED SEPT. 25, 1908.

930,385.

Patented Aug. 10, 1909.
2 SHEETS—SHEET 2.

Witnesses
Chas. C. Richardson.
C. N. Woodward.

Inventor
Royal J. Kennedy,
By
Attorneys.

UNITED STATES PATENT OFFICE.

ROYAL J. KENNEDY, OF BURR OAK, KANSAS.

COMBINATION-TOOL.

No. 930,385.　　　　Specification of Letters Patent.　　　Patented Aug. 10, 1909.

Application filed September 25, 1908. Serial No. 454,750.

*To all whom it may concern:*

Be it known that I, ROYAL J. KENNEDY, a citizen of the United States, residing at Burr Oak, in the county of Jewell, State of Kansas, have invented certain new and useful Improvements in Combination-Tools; and I do hereby declare the following to be a full, clear, and exact description of the invention, such as will enable others skilled in the art to which it appertains to make and use the same.

This invention relates to combination implements or tools adapted to be employed for a variety of purposes, and has for one of its objects to improve the construction and increase the efficiency of devices of this character.

Another object of the invention is to provide a simply constructed implement of this character by means of which wire staples may be drawn, wires twisted, and material or objects severed.

With these and other objects in view the invention consists in an implement comprising a pair of opposing jaws provided with under cut inner portions with a cutting blade upon one portion and operating beneath the other portion, spaced wire receiving recesses at right angles to the transverse plane of the cutting blade, and wire receiving recesses in the opposing faces of the jaws and in parallel relations to the cutting blade.

Figure 4:
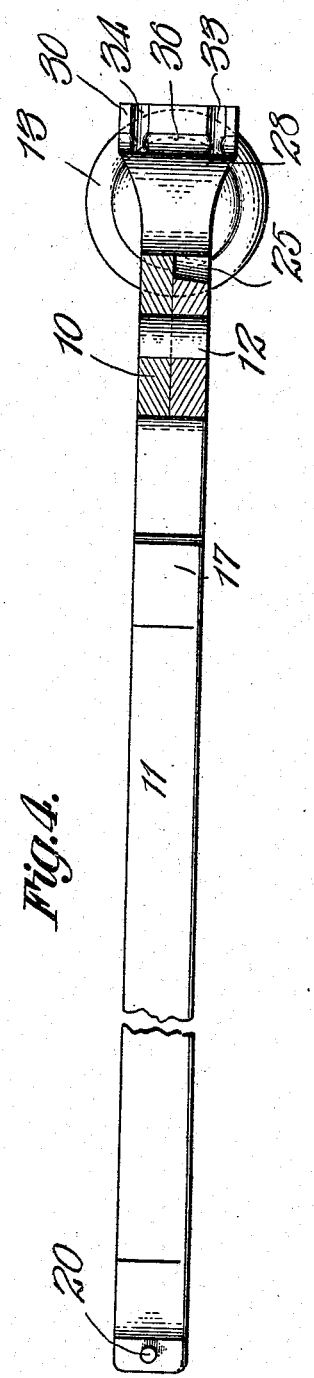
Figure 5:
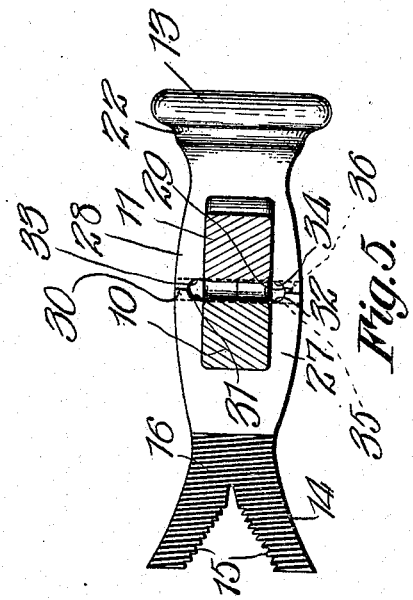
Figure 3:
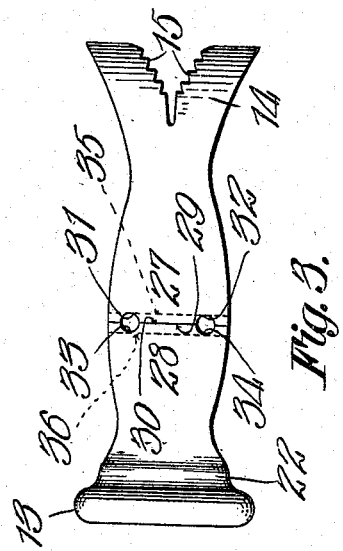

The invention further consists in certain novel features of construction as hereafter shown and described and then specifically pointed out in the claims, and in the drawings illustrating the preferred embodiment of the invention, Figure 1 is a side elevation of the improved implement. Fig. 2 is an edge view of the same. Fig. 3 is an end view of the improved implement. Fig. 4 is a section on the line 4—4 of Fig. 1. Fig. 5 is a section on the line 5—5 of Fig. 1.

The improved implement comprises two arms 10—11 pivotally united at 12 near one end. One arm at its shorter end is provided with a hammer head 13 and the other arm is provided at its shorter end with a nail extracting claw 14. The claw portion of the improved implement is provided with serrated teeth 15 in its inner faces, the teeth extending obliquely to the outer face of the claw, while the inner faces of both claws are provided with serrations or teeth 16, the latter likewise extending obliquely to the longitudinal plane of the members 10—11.

By this arrangement it will be obvious that when the two members 10—11 are drawn toward each other the claw 14 will be separated from the body of the member 10 and form a pipe engaging jaw or wrench, the teeth 16 serving to grip the pipe and enabling it to be turned by the leverage force applied to the members 10—11 when separated, as will be obvious. The serrations 15 within the claw 14 likewise form an effectual wrench by which a nut or bur as well as a pipe or rod may be firmly gripped and rotated by leverage power applied to the members 10—11. Extending from the member 11 is a projection 17 which forms the anvil portion of a saw set, while another projection 18 having a stud 19 and extending from the member 10 coacts with the anvil 17 to complete the saw set portion of the device. The free end of the member 10 is provided with a punch member 20 coacting with an aperture 21 in the free end of the member 11, the punch and aperture forming an effectual leather punch by which buckle holes may be readily made in straps.

Formed in the member 11 at the inner end of the hammer head 13 is a recess 22, and formed in the member 11 adjacent to the pivot 12 is a similar recess 23. The two recesses 22 and 23 are adapted to be moved toward each other when the members 10—11 are separated, as will be obvious, and are designed to be employed in applying rings to the noses of hogs, the rings being furnished in split form as shown at 24 with their terminals separated and pointed. When the implement is to be employed one of the rings with its terminals in separated position is inserted in the recesses 22—23 when the members 10—11 are in closed position, and then by placing the terminals of the ring within the nostrils of the hog and separating the members 10—11, the terminals of the ring will be forced through the cartilage between the nostrils of the hog, and the ring thus applied.

Formed in the member 11 in advance of the pivot 12 is a recess 25, and formed in the member 10 in advance of the pivot 12 is a similar recess 26, the two recesses coacting to form a wire cutting device.

Formed upon the member 11 at the terminal of its shorter end is a jaw 27, and formed upon the corresponding terminal of the member 10 is a similar jaw 28, the confronting faces 29—30 of the two jaws forming pincer or nipper elements adapted to engage an article between them when the members 10—11 are moved toward each other.

Formed in the portion 27 of the member 11 contiguous to the surface 30 are spaced grooves 31—32, the grooves extending parallel to the longitudinal plane of the handle, and in the jaw 28 are similar grooves 33—34, the latter grooves extending in the same longitudinal plane as the handle 10. By this arrangement when the members 10—11 are compressed to bring the surfaces 29—30 together or in contact, the grooves 31—32—33—34 will form spaced circular apertures between the members 27—28 near their side faces.

Formed in the contiguous faces of the jaws next to their inner terminals, are other grooves 35—36 extending transversely to the longitudinal plane of the handles.

Connected to one of the jaws 27 or 28 is a cutting blade 37 adapted to engage over the adjacent side face of the other jaw 27 or 28, and thus form a cutting implement. For the purpose of illustration the blade 37 is shown attached to the jaw 28 of the member 11 and operating beneath the adjacent inner face of the jaw 28 of the member 10, but it will be obvious that the position of the blade might be reversed and attached to the jaw 27 and operating beneath the jaw 27 without departing from the principle of the invention, and it is not desired therefore to limit the position or location occupied by the blade relative to the jaws 27 or 28. The blade 37 forms an effective cutting implement which may be employed for trimming hoofs of horses or for like purposes. The grooves 31—33 produce relatively sharp edges respectively upon the jaws 27—28 of the members 10—11, which enable the implement to be employed effectually for removing staples and for similar purposes.

When the faces of the surfaces 29—30 are moved toward each other by the compression of the members 10—11, the opposing grooves 31—33 or 32—34, as the case may be, may be effectually employed in splicing fence wires by bending the end of the wire to be spliced backwardly upon itself and thence across the body of the wire with the end inserted between the grooves 31—33 or between the grooves 32—34 as the case may be and compressing the members 10—11 and then rotating the implement around the main wire to coil the bent or end portion of the wire around the main wire. This action forms an eye in the main wire, and by inserting the end of the wire to be spliced through the eye thus formed and repeating the operation above described, the two parts of the wire are effectually coupled, as will be obvious.

The implement is simple in construction, can be inexpensively manufactured, and operates effectually for the purposes required.

What is claimed, is:—

1. An implement of the class described comprising two arms pivotally united near one end and extended into handles at one side of the pivot and with opposing grip faces at the other side of the pivot, said grip faces having opposing recesses spaced apart and extending in the same longitudinal plane as the handles, and a cutting blade connected to one of said jaws between said recesses and operating beneath the adjacent inner face of the other jaw.

2. An implement of the class described comprising two arms pivotally united near one end and extended into handles at one side of the pivot and with opposing grip faces at the other side of the pivot, said grip faces having opposing recesses spaced apart and extending in the same longitudinal plane as the handles and with opposing recesses in the grip faces and communicating with the spaced recesses and extending at right angles to the longitudinal plane of the handles, and a cutting blade connected to one of said jaws between said recesses and operating beneath the adjacent inner face of the other jaw.

In testimony whereof, I affix my signature, in presence of two witnesses.

ROYAL J. KENNEDY.

Witnesses:
M. C. BERKELEY,
V. DAVIS.